United States Patent
Noro et al.

(12) 
(10) Patent No.: US 6,316,530 B1
(45) Date of Patent: Nov. 13, 2001

(54) BINDER AND MOLDING PROCESS EMPLOYING THE SAME FOR USE IN MOLDING METALLIC AND CERAMIC POWDERS

(75) Inventors: Yoshihisa Noro, Kanagawa-ken; Yasufumi Ishii, Shizuoka-ken, both of (JP)

(73) Assignee: Shimizu Shokuhin Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/592,282

(22) Filed: Jun. 12, 2000

(30) Foreign Application Priority Data

Jan. 31, 2000 (JP) ................................................ 12-021190

(51) Int. Cl.$^7$ ....................................................... C08L 5/12
(52) U.S. Cl. ................................................ 524/27; 527/55
(58) Field of Search ........................... 106/205.01, 205.9; 524/27, 55

(56) References Cited

U.S. PATENT DOCUMENTS

| | | | | |
|---|---|---|---|---|
| 4,734,237 | * | 3/1988 | Fanelli et al. | 264/122 |
| 5,258,155 | * | 11/1993 | Sekido et al. | 264/109 |
| 5,643,594 | * | 7/1997 | Dorian et al. | 264/8 |
| 5,746,957 | * | 5/1998 | Fanelli et al. | 264/109 |

* cited by examiner

Primary Examiner—Mary Lynn Theisen
(74) Attorney, Agent, or Firm—Wenderoth, Lind & Ponack, L.L.P.

(57) ABSTRACT

A binder is used for molding starting powder materials such as metallic and ceramic powders. A high-viscosity agar which belongs to one type of natural poly-glycols, having a gel strength less than 3000 g/cm and a sol viscosity greater than 350000 mPa s (milliPascal seconds) is used as the binder.

2 Claims, 3 Drawing Sheets

BINDER AND MOLDING PROCESS EMPLOYING THE SAME FOR USE IN MOLDING METALLIC AND CERAMIC POWDERS

BACKGROUND OF THE INVENTION

The present invention generally relates to a molding of raw powders such as metallic and ceramic powders, and more particularly to an optimum binder and a molding process employing the same for use in a molding process utilizing raw materials such as metallic or ceramic powders as starting material.

Recently, a molding process (injection molding process, in particular), in which powders such as metallic or ceramic ones are used in molding/degreasing/sintering operations has found its widespread application in a variety of industrial fields. A reason for it is that the process may ensure a consistent and continuous supply of products having increased dimensional accuracy as required by the current industrial applications.

However, conventional molding processes still have a requirement that a degreasing operation should be carried out prior to the sintering step in a shorter time and more straightforward manner for the purpose of increasing productivity. Thus, various approaches have been made so far in an attempt to propose a solution to these problems. For example, the inventor et, al of the present invention has found that a binder may be easily thermally dissolved at a reduced temperature, by a certain process disclosed, in which an agar having gel strength of at least 2000 g/cm$^2$ at least at 2% concentration is used as starting powders in order to provide a binder that may allow one to dispense with the need of applying a degreasing step using a special device (JP. Pat. Publication Hei 7-68566). The inventor has also disclosed a novel pressure-molding process that is designed to solve the above-described problem by utilizing an agar as a binder (JP. Pat. Appln. Hei 8-141386).

U.S. Pat. No. 4734237 discloses a process in which ceramic materials are molded and sintered utilizing an agar having at least 100 g/cm$^2$ gel strength at least at 2% concentration. Additionally, U.S. Pat. No. 5,087,595 discloses a process in which an additive is added to the gel of agar to allow it to have at least 1900 g/cm$^2$ gel strength.

These processes are all designed so as to reduce a time that otherwise would be consumed during the degreasing step to be taken prior to the sintering operation, while achieving a simplification etc., and these approaches are based upon a prerequisition that the moldability of starting powders depends upon the gel strength of binders.

It is a widely appreciated fact that the molded products may increase their weight in a slight incremental manner at the time of molding in case that an agar having reduced gel strength is used when gas-atomized titanium powders are being injection molded, whereas molded products may not apparently increase their weight when an agar having increased gel strength is used.

Mutual entanglement of powders is hard to expect, when true sphere powders such as gas-atomized powders are being injection molded. Consequently, in order to ensure a consistent transfer of molding materials that have been obtained by kneading starting powders with a binder beforehand without causing them to be separated at a plasticizing section where the material may be plasticized or at a weighing section where the amount of material to be injected may be weighed, in the screw of the injection molding machine, while ensuring a consistent filling of the mold cavity with materials that have been injection molded, several parameters and the like must be satisfied, including such a need that binders should be supplied in a suitable volume, starting powders and binders should have such a viscosity that may allow them to travel at substantially an equal speed. That is, the weight and dimensions of the molded products which are used as a reference for evaluating a molding consistency depend upon characteristics of binders.

Therefore, in case that the agar is selected merely with basis on its gel strength and the agar thus selected is used as a binder, it has been impossible for that operation to achieve an optimum balance between an amount of binder and a viscosity which may allow starting powders and a binder to travel substantially at an equal speed simultaneously, no matter what selection is being made. As a result, there arises a problem that a designer must tolerate a fact that the weight and dimensions of molded products upon which a molding consistency may be evaluated are determined by characteristics of binder.

Furthermore, it is desirable that a proportion of binder used should be low as much as possible, when injection molding and sintering operations are applied for such active metallic powers as carbons such as, for example, titanium and metallic powers of increased silicon contents that may be easy to produce carbides with carbons that are derived from the binder at a low temperature zone. It is also preferable that a proportion of the binder used should be low as much as possible so as to reduce an amount of carbonic residues in sintered products, with respect to soft magnetic powder materials which may not function as required unless they are used with reduced carbon proportion. However, in a conventional art, reduction of proportion of the binder used has led to a drawback that, molding materials lack in flowability and thereby impairing quality of molded products. Consequently, there is a limit to a degree that may reduce a proportion of binder used, and actually there has been a problem that a proportion of binder used may not be decreased.

Moreover, during an injection molding, if reduction in a proportion of binder used is attempted, a relative proportion of starting powders used may increase, and thereby reducing a shrinkage rate so that dimensional consistency of sintered products may be increased.

However, if a binder having reduced viscosity is used, it may be withdrawn alone and peeled off to impair a molded product, due to an injection pressure and a friction between starting powders. Therefore, the binder has been used in a ratio greater than theoretically required, resulting in such a problem that an operator must be always concerned about dimensional consistency of the products.

The pressure-molding process may produce a molded product by compressing a molding material which has been loaded into the molding frame from one axial direction, but the binder which may be squeezed out through a clearance between the molding frames during a compressing step through a clearance on the molding frame is limited to one located at a circumferential position, if the binder has excessively reduced viscosity, and thus quality of molded product may become inconsistent. Furthermore, a molding material must retain a predetermined pressure on it in order to allow a reliable transmission of pressure, but such a pressure may not be retained because the molding material may leak out through a clearance between the molding frames if viscosity of binder is excessively low.

Additionally, as to a relationship among concentration, gel strength and sol viscosity of agar, it may be mentioned that an agar having increased gel strength displays increased viscosity, whereas a gel strength of agar is in proportion to molecular weights of agar, and a dissolving rate of agar is in proportion to molecular weights of agar. As a result, it is known to those skilled in the art that a limit that agar having increased gel strength may dissolve is around 30%, and such agar having increased gel strength can only be used in a range of around 30% within which the agar may dissolve. As above-described, a range that the agar may dissolve is limited, and accordingly there arises a problem that such agar may only be used in a limited field of application.

To solve the above-described problem according to the present invention, a high viscosity agar is used as a binder which is one type of natural poly-glycols having gel strength of less than 3000 g/cm$^2$ and sol viscosity of 35000 mPa·s (milli Pascal·second), having its concentration of for example, around at least 6 weight percent that is displayed at this moment, when dissolved in a hot water. Though this increased viscosity agar has gel strength approximately equal to that of the agar that is used for commercially available foodstuffs, its sol viscosity is 3–5 times greater than that of agar having increased gel strength. Predicating for the binder an agar concentration which may realize much 1000000 mPa·s viscosity, which is equivalent to that of the plastic wax-based binders, it can be mentioned that the binder of the present invention corresponds to 16–17% concentration, and thus its viscosity will be 2980000 mPa·s at 20% concentration, indicating its possible viscosity approximately three times greater than that of plastic wax-based binder.

In accordance with the present invention, means for solving the problem may be proposed in which natural poly-succharoses such as karaginan, algin, mannan and derivatives thereof which are derived from the above-described substances may be used as a binder in place of the above-described agar having high gel strength. Desirably, various problems as above-described may be solved by using a highly viscous agar having gel strength less than 3000 g/cm$^2$ and sol viscosity greater than 35000 mPa·s.

That is, in accordance with the present invention, a molding material having extremely increased viscosity may be produced by using an agar having reduced gel strength and increased sol viscosity as truly spherical gas-atomized metallic powders having a concentration equal to that of the agar having high gel strength, in place of conventional agar having high gel strength. This may permit one to solve the problem that a weight loss may occur every time the molding shot is being made.

Besides, when the agar having reduced gel strength and increased sol viscosity is used in the same concentration as that of the high gel strength agar, its viscosity will be 2980000 mPa·s at 20% concentration, indicating its viscosity is approximately 3 times greater than that of plastic wax-based binder. Thus, a consistent transport may be ensured, even when a ratio of metallic powders used is increased, without variation in a ratio between metallic powders and the binder and thereby solving a problem that a maximum variation in weight of products would impair dimensional accuracy of sintered products.

In addition, when an agar (High Viscosity Agar shown in FIG. 4) having reduced gel strength and increased sol viscosity is used in 16%–17% of a concentration lower than that of the agar having increased gel strength by about 10% in place of the conventional agar (MA-2000 shown in FIG. 4) having increased gel strength, a resulting viscosity may be 1000000 mPa·s equivalent to that of plastic wax-based binder. Thus, it is possible to lower proportion of binders used as much as possible, even when such starting powders are used as active metallic powders, such as, for example, titanium, high silicon-containing metallic powders and soft magnetic powder material which tend to form carbides with residual carbons from the binder at a low temperature zone during the sintering.

When an agar having reduced gel strength and increased sol viscosity is used in the same concentration with that of an agar having increased gel strength in place of conventional agar having increased strength, a resulting viscosity may become 2980000 mPa·s at 20% concentration, the viscosity being about three times greater than that of plastic wax-based binder. Consequently, a proportion of starting powders used may increase in case of starting powders that have sufficient viscosity equivalent to that of the conventional level, and thereby elevating a green viscosity of molded products. Thus, a sintering shrinkage rate may be reduced, and consequently dimensional stability of sintered products may be improved.

Moreover, when an agar having reduced gel strength and increased sol viscosity is used in place of conventional agar having increased gel strength at the same concentration as that of agar having increased gel strength, a resultant viscosity may be 2980000 mPa·s at 20% concentration, the viscosity being about three times greater than that of plastic wax-based binder. Thus, it is possible to reduce an amount of binder used in such a circumstance that may allow viscosity equivalent to that of plastic wax-based binder to be used. As a result, it is possible to solve the problem that a dimensional variation may occur due to use of binders at a ratio greater than the level as theoretically required. In other words, high viscosity molded products may be derived when the binder is used at about 20% concentration, the viscosity being about three times greater than that of plastic wax-based binder, unless a proportion of starting powders used is varied. Consequently, it is possible to solve the conventional problem that the binder is withdrawn alone or peeled off for reason of injecting pressure to be applied and friction between starting powders, and thereby impairing molded products to be produced, if a low-viscosity binder is used. Practically, it is possible to solve such a problem in the prior art that the binder is used at a ratio greater than the level as theoretically required for that binder, requiring an operator to be always concerned about dimensional stability of sintered product.

Moreover, when an agar having reduced gel strength and increased sol viscosity is used in the same concentration as that of agar having increased gel strength in place of conventional agar having increased strength, a resultant viscosity may become 2980000 mPa·s at 20% concentration, the viscosity being about three times greater than that of plastic wax-based binder. Thus, no leakage may occur through a clearance between the mold frames to maintain a pressure at a sufficient level, unless starting powders are used at a variable ratio. Moreover, a problem in a prior art that merely the binder located adjacent to the mold frame may be squeezed out due to its reduced viscosity may be solved, and thereby solving a problem that the molding quality becomes inconsistent, and molding materials may leak through a clearance between mold frames to make it difficult to maintain a pressure.

Furthermore, if we attempt to predict a possible concentration for an agar that may yield a viscosity of 1000000 mPa·s equivalent to that of plastic wax-based binder, it is found that 16–17% concentration is adequate to allow the agar itself to be dissolved. Thus, this may solve the problem that the range of application for the agar is limited.

BRIEF DESCRIPTION OF THE DRAWINGS

The present invention will be described in details hereinbelow for several embodiments with reference to accompanying drawings, in which.

DETAILED DESCRIPTION OF THE INVENTION

The preferred embodiments of the present invention will be described hereinbelow, by comparing it with a known prior art.

EXAMPLE 1

According to the present invention, a molding material has been prepared by kneading under heat 5.4 g stearic acids, 2.7 g emulsifiers, 30.6 g agar having increased viscosity (LGP-800 was used, which is available from Shimizu Shokuhin Co., Ltd. 11-26, Tsukiji-cho, Shimizu-shi, Shizuoka-ken, Japan) and 141.3 g demineralized water with 1215 g titanium powders having a mean grain size of 23 $\mu$m in a pressure kneader, in order to produce titanium powders of true spheres by injection molding, with 40 vol % proportion of binder and 17 vol % ratio of agar relative to the binder.

TABLE 1

Type of Agar, Maximum, Minimum and Mean Values of Weight of Molded Products

| | Maximum Value | Minimum Value | Mean Value | Maximum Deviation |
|---|---|---|---|---|
| BSL-1400 | 9.629 | 9.534 | 9.573 | 0.095 |
| MA-2000 | 9.613 | 9.568 | 9.583 | 0.045 |
| High Viscosity Agar (LGP-800) | 9.610 | 9.582 | 9.592 | 0.028 |

Figure 1:
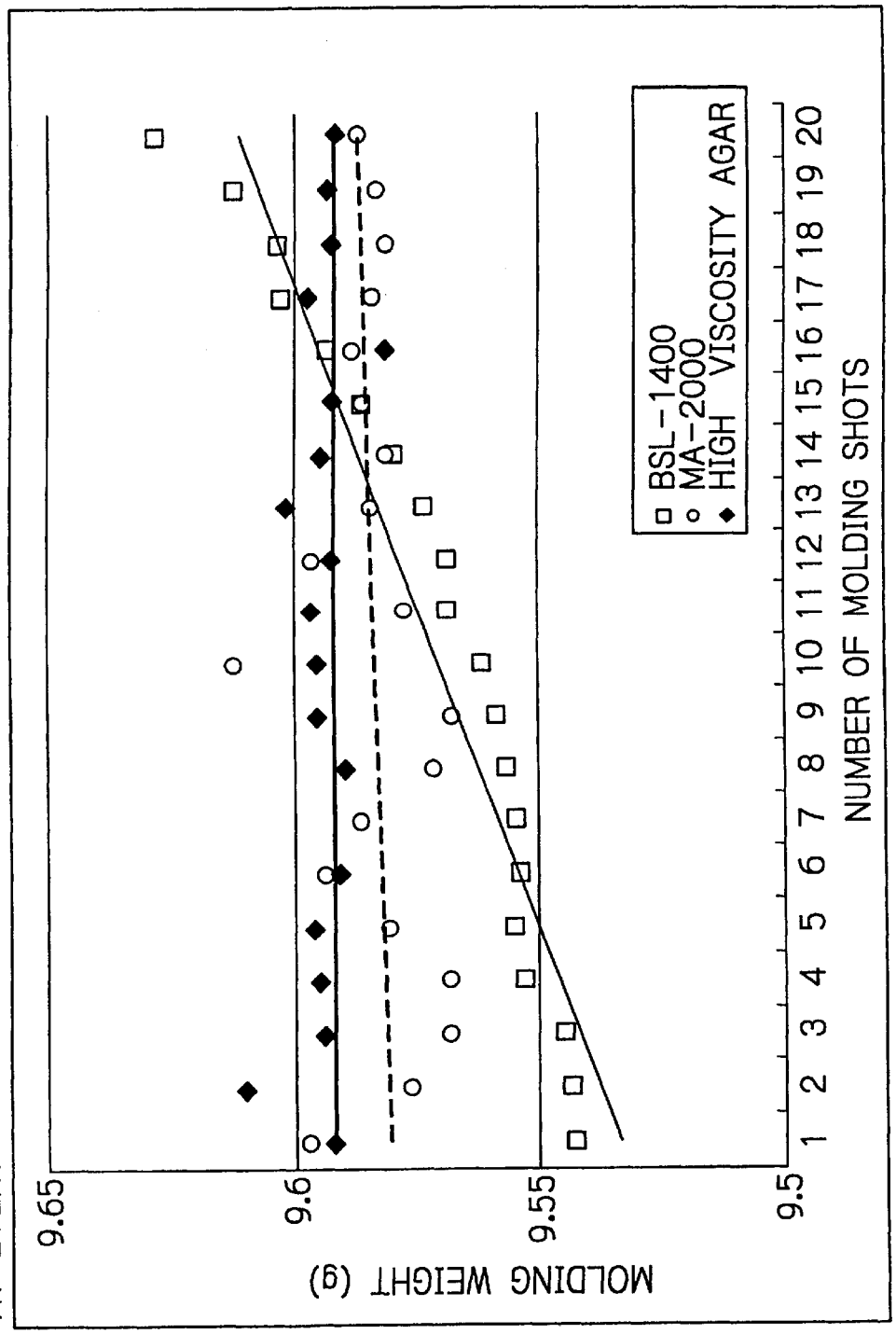
FIG. 1 is a diagram showing variation in weight of molded products at every molding shot when injection molding operation is carried out by kneading known agars each having different gel strength together with the agar of the present invention and true-sphere-like gas-atomized titanium powders.

Table 1 shows a variation of weight in molded products at every molding shot, in case that injection molding is being made for the gas-atomized titanium powders using various agars as binders respectively; BSL-1400 agar having 1650 g/cm$^2$ gel strength at 2% concentration, MA-2000 agar having 3025 g/cm$^2$ gel strength at 2% concentration, and the high viscosity agar of the present invention. When the injection molding was carried out using an agar (BSL-1400) having reduced gel strength as the binder, molded products increased weight in slight increments at every molding shot, and they have been found to provide 0.095 g weight increase during the step of 20 shots. On the other hand, when the injection molding is made using an agar (MA-2000) having increased gel strength as the binder, a maximum weight deviation was 0.045 g. In contrast, when the injection molding was made using an agar having increased viscosity as prepared in accordance with the present invention as the binder, it first displayed some fluctuation but it stabilized thereafter, resulting in maximum value 9.610 g, minimum value 9.582 g, maximum deviation 0.028 g and mean value 9.592 g. Such values were stably maintained at an extremely constant level, even if the molding materials in which a high-viscosity agar of the present invention was used as the binder were injection molded with the number of 100 shots. These conditions are illustrated in FIG. 1.

In case of agar MA-2000 having increased gel strength, as shown in Table 1, since it was kneaded with 42 vol % proportion binder and 25% agar ratio relative to the binder, components were found to have proportions as follows; 1174.5 g titanium powders having mean grain size 23 $\mu$m, 5.67 g stearic acid, 2.84 g emulsifying agent, 47.25 g agar, and 133.2 g demineralized water.

Comparing a blending ratio between the agar and water, it was 30.6:141.3 (or about 1:4.6) for the agar having increased viscosity of the present invention, and 47.25:133.2 (or about 1:2.8) for the agar having increased gel strength, which means that an agar having increased viscosity may be dissolved more easily. Then, comparing the total weight of agar, stearic acid and emulsifiers which would form carbons with the weight of metallic powders, it was 38.7:1215 (or about 1:31.4) for the agar having increased viscosity and 55.76:1174.5 (or about 1:21.1) for the agar having increased gel strength, which means that the agar having increased strength may display a higher proportion of metallic powders.

Figure 2:
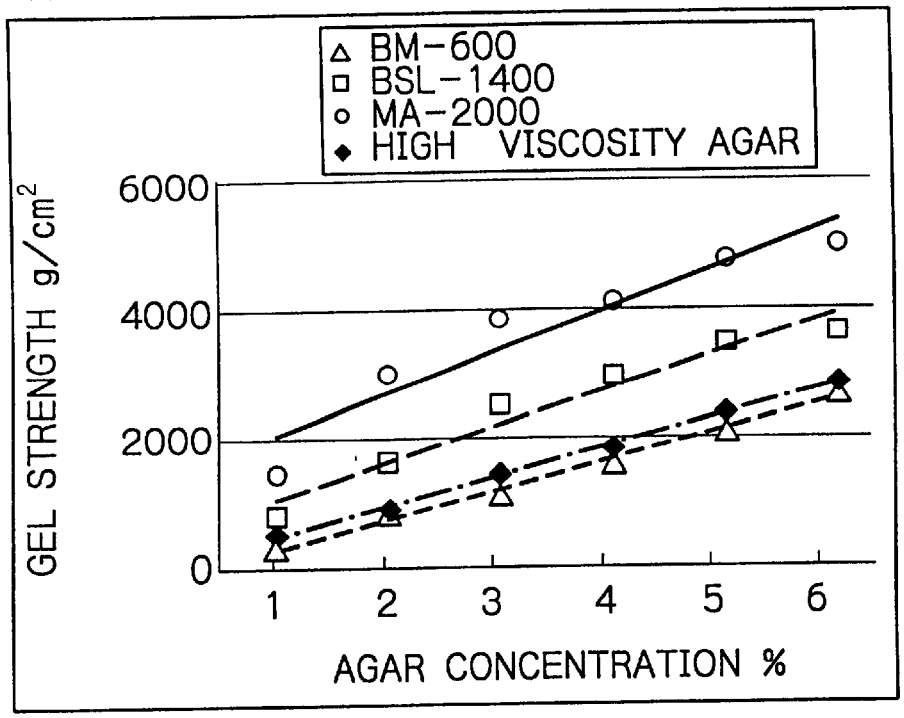
FIG. 2 is a diagram showing variation in gel strength up to 1–6% concentration range of three known agars each having different gel strength, and a high viscosity agar (LGP-800) for use in the present invention.
Figure 3:
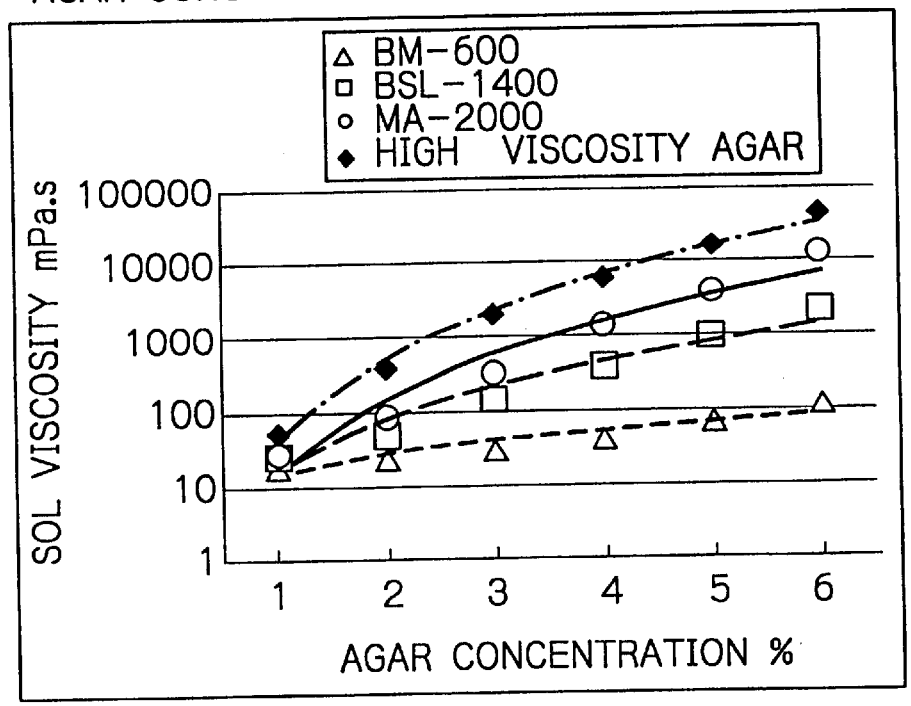
FIG. 3 is a diagram showing variation in sol viscosity up to 1–6% concentration range of three known agars each having different gel strength, and a high viscosity agar (LGP-800) for use in the present invention.

FIGS. 2 and 3 illustrates a relationship in terms of gel strength and sol strength among three known agar types, i.e., agar BM-600 which displays 870 g/cm$^2$ gel strength at 2% concentration, agar BSL-1400 which displays 1650 g/cm$^2$ gel strength, agar MA-2000 which displays 3025 g/cm$^2$ gel strength and the agar having increased viscosity. As the concentration of agar increases, the gel strength increases in a primary functional relationship (see FIG. 2), whereas the sol viscosity increases exponentially (see FIG. 3). Furthermore, in case of BM-600, BSL-1400 and MA-2000 (all of which are available from Shimizu Shokuhin Co., Ltd., Shizuoka-ken, Japan), there is a correlative relationship between them in terms of gel strength and gel viscosity, which indicates that an agar having increased gel strength again has increased sol viscosity. However, in case of the agar having increased viscosity of the present invention, its sol strength was higher than those of known agars in spite of its reduced gel strength.

As above-described, it is known to those skilled in the art that gel strength of agar is in proportion to molecular weights of agar. Table 2 and 3 illustrate a relationship among gel concentration, gel strength and gel viscosity respectively.

TABLE 2

Relationship Between Concentration and Gel Strength of Agar

| | Concentration 1% | Concentration 2% | Concentration 3% | Concentration 4% | Concentration 5% | Concentration 6% |
|---|---|---|---|---|---|---|
| BM-600 | 370 | 870 | 1155 | 1650 | 2117 | 2667 |
| BSL-1400 | 850 | 1650 | 2530 | 2948 | 3461 | 3589 |

TABLE 2-continued

Relationship Between Concentration and Gel Strength of Agar

| | Concentration 1% | Concentration 2% | Concentration 3% | Concentration 4% | Concentration 5% | Concentration 6% |
|---|---|---|---|---|---|---|
| MA-2000 | 1485 | 3025 | 3846 | 4102 | 4743 | 4935 |
| High Viscosity Agar (LGP-800) | 560 | 926 | 1485 | 1842 | 2365 | 2820 |

TABLE 3

Relationship Between Concentration and Sol Viscosity of Agar

| | Concentration 1% | Concentration 2% | Concentration 3% | Concentration 4% | Concentration 5% | Concentration 6% |
|---|---|---|---|---|---|---|
| BM-600 | 18 | 23 | 30 | 42 | 65 | 102 |
| BSL-1400 | 24 | 48 | 138 | 361 | 851 | 1898 |
| MA-2000 | 26 | 78 | 293 | 1357 | 3643 | 12000 |
| High Viscosity Agar (LGP-800) | 49 | 367 | 1910 | 5740 | 15700 | 40740 |

Figure 4:
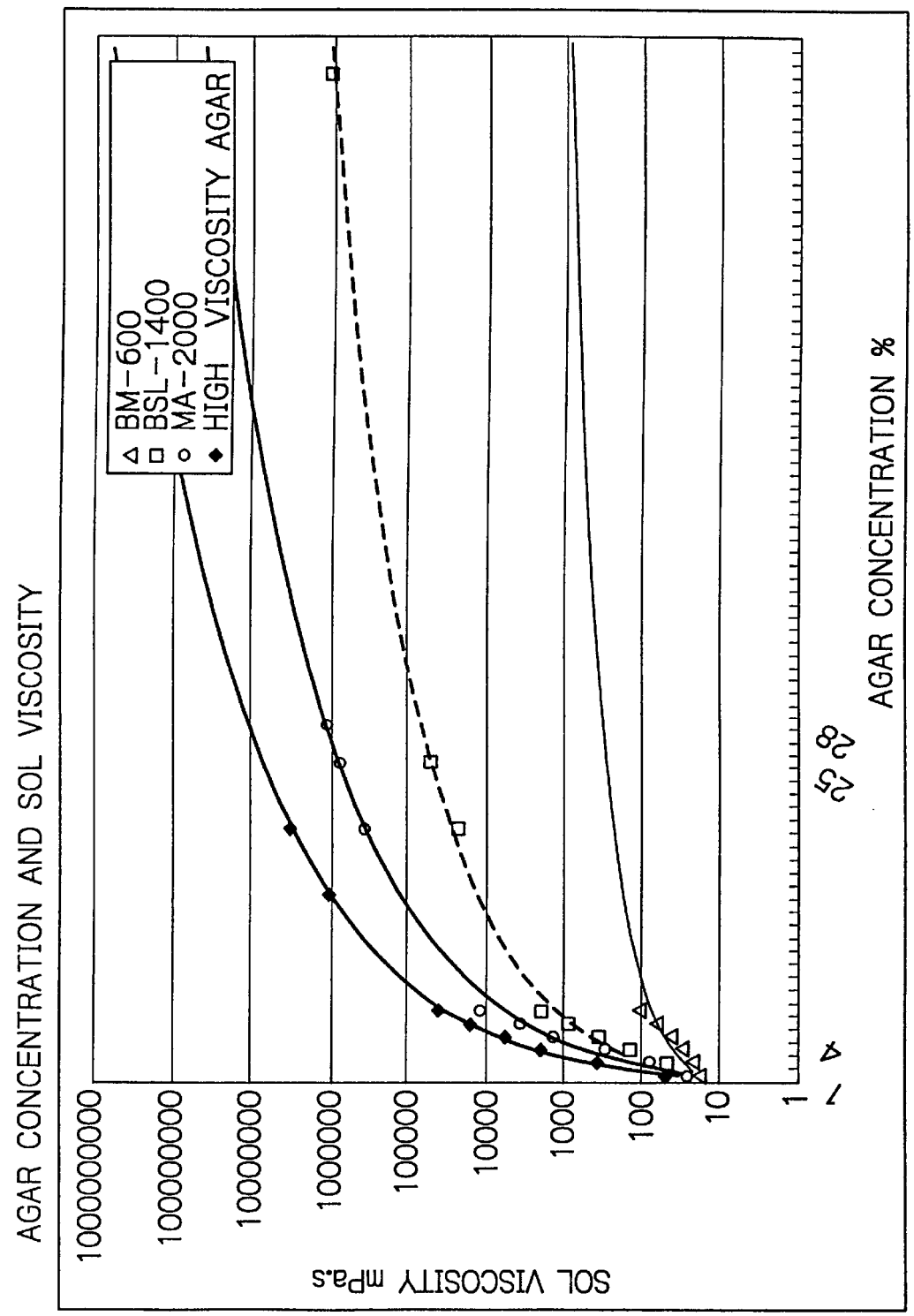
FIG. 4 is a curve showing a viscosity in a 15–20% concentration range presumed from sol viscosity measurements up to 1–6% concentration range for three known types of agar each having different sol viscosity, and a high viscosity agar (LGP-800) to be used in the present invention.

FIG. 4 is a curve which illustrates viscosity which has been predicted from various agars; BM-600, BSL-1400, MA-2000 and high viscosity agars of the present invention at 20–25% concentration, which were used as the binder, with reference to data as indicated in FIGS. 2 and 3, Table 2 and 3. As indicated in FIG. 4, the viscosity was 23000–49000 mPa·s for the BSL-1400, and 350000–720000 mPa·s for the MA-2000, which are reduced in comparison with a common level of 1000000 mPa·s for the plastic wax-based binder. Although it may be presumed by calculation that a concentration which may yield a viscosity equivalent to that of plastic wax-based material is about 28% for the MA-2000, and about 78% for the BSL-1400, a dissolution limit of agar is approximately 30%, and so the agar may only be used in a range within which it may be dissolved.

On the contrary, in case of the high viscosity agar of the present invention which is one type of natural poly-glycols having sol viscosity greater than 35000 mPa·s and gel strength less than 3000 g/cm² at least at 6% by weight at a certain concentration which allows it to be dissolved in a hot water, it showed gel strength equivalent to or slightly higher than that of the agar which was used for commercially available foodstuffs, but it displayed sol viscosity 3–5 times greater than that of the high-gel strength agar. Furthermore, when presuming a concentration of agar which may yield 1000000 mPa·s viscosity equivalent to that of the plastic wax-based binder with reference to these data, it was found that it was equivalent to 15–16%, and had 2980000 mPa·s viscosity at 20% concentration, which is about three times greater than that of plastic wax-based binder.

EXAMPLE 2

Then, in case of pressure-molding a tool steel SKD-11 with 42 vol % proportion binder and 20% ratio agar relative to the binder, a molding material has been prepared by kneading under heat 11.3 g stearic acid, 2.84 g emulsifiers, 37.8 g high viscosity agar and 137 g demineralized water in the weight of 1989 g SKD-11 powders having mean grain sizes of 10.9 μm. This molding material was poured into a pressure-molding die which had been heated beforehand to 50° C. by applying a heat of 60° C. or higher level, and retained it at the pressure level of 5 Mpa for 20 minutes, followed by the step of removing molded products. In case of conventional high-gel strength agar, there were several drawbacks such as leakage through the clearance between dies; imperfect molding; and micro surface cracks. Such defects have not been detected on the high-viscosity agar. Furthermore, the molded products were dried, and shaped by means of turning machines such as machining, and then sintered to produce a product. Since the pressure was consistently transmitted during the molding operation, sintered products were provided having superior dimensional consistency.

EXAMPLE 3

Where water-atomized SUS304L powders were injection molded with 40 volt proportion binder, and 17% ratio agar relative to binders, a molding material was produced, by kneading under heat 5.4 g stearic acid, 2.7 g emulsifier, 30.6 g high-viscosity agar and 141.3 g demineralized water with the weight of 2074 g water-atomized SUS304L powders having agar mean grain size of 10.14 μm in a pressure kneader. This molding material was injection molded according to a predetermined process, and after applying a drying operation, it was poured into a sintering kiln without the degreasing step, where it was retained at 1350° C. for two hours so that they might be sintered. Sintered products thus produced had 7.59 viscosity, 97.65% relative humidity and 0.021% carbon residues which was 0.03% less than the level as specified. In the conventional high-gel strength agar, a molding material was prepared by kneading under heat 5.7 g stearic acid, 2.84 g emulsifier, 47.25 g high-gel strength agar and 133 g demineralized water with the weight of 2004 g water-atomized SUS304L powders having a mean grain size of 10.14 μm, in a pressure-kneader so as to allow the agar have 42 vol % proportion and 25% ratio relative to the binder. This molding material was injection molded in accordance with a predetermined process, retained at 260° C. in an ambient atmosphere and then heated for 2 hours. The material was then put into a sintering kiln and retained at 1350° C. for two hours so that it might be sintered. The resultant sintered product had 7.34 viscosity, 95.57% relative density and 0.028% carbon residues which was 0.03% or more less than the specified level.

The binder in accordance with the present invention belongs to a type that may be applied in the molding operation of metallic and ceramic powders, especially one type that consists of natural poly-glycols with reduced gel strength and increased sol viscosity. More particularly, it was the binder that consists of natural poly-glycols having gel strength less than 3000 g/cm² and sol viscosity greater than 35000 mPa·s (mill Pascal·second). The binder may be useful in the molding operation of metallic or ceramic powders, especially when they are made by an injection molding process and pressure-molding process.

In accordance with the present invention, it is possible to provide a molding material which has a viscosity greater than that of conventional one, and therefore it provides a molded product which is consistent in its weight and is free from any defect, during the injection molding or pressure-molding process. Furthermore, the present invention may permit production of sintered products which have an improved dimensional consistency and reduced carbon residues, without the need of using a special system or applying a degreasing operation which would otherwise consume a substantial time.

What is claimed is:

1. A binder for use in a molding operation of metallic or ceramic powders, wherein said binder comprises a natural poly-succharose having gel strength less than 3000 g/cm$^2$ and sol viscosity greater than 35000 mPa·s (milli Pascal·second).

2. A molding material comprising metallic or ceramic powder and a natural poly-succharose having gel strength less than 3000 g/cm$^2$ and sol viscosity greater than 35000 mPa·s (milli Pascal·second).

* * * * *